United States Patent
Labrunie et al.

(10) Patent No.: US 8,134,342 B2
(45) Date of Patent: Mar. 13, 2012

(54) METHOD FOR PULSED CHARGING OF A BATTERY IN AN AUTONOMOUS SYSTEM COMPRISING A SUPERCAPACITANCE

(75) Inventors: Antoine Labrunie, Paris (FR); Arnaud Delaille, Bassens (FR); Sylvie Genies, Saint Egreve (FR)

(73) Assignee: Commissariat a l'Energie Atomique, Paris (FR)

( * ) Notice: Subject to any disclaimer, the term of this patent is extended or adjusted under 35 U.S.C. 154(b) by 423 days.

(21) Appl. No.: 12/461,579

(22) Filed: Aug. 17, 2009

(65) Prior Publication Data

US 2010/0066309 A1   Mar. 18, 2010

(30) Foreign Application Priority Data

Sep. 16, 2008   (FR) .................................... 08 05075

(51) Int. Cl.
    *H01M 10/44*   (2006.01)
(52) U.S. Cl. ........................................................ 320/141
(58) Field of Classification Search .................. 320/107, 320/114, 127, 128, 135, 139, 141, 166, 167
    See application file for complete search history.

(56) References Cited

U.S. PATENT DOCUMENTS

| | | | | |
|---|---|---|---|---|
| 5,502,354 A | * | 3/1996 | Correa et al. | 315/111.01 |
| 5,869,970 A | * | 2/1999 | Palm et al. | 324/433 |
| 6,924,623 B2 | * | 8/2005 | Nakamura et al. | 320/132 |
| 7,235,326 B2 | * | 6/2007 | Nakamura et al. | 429/49 |
| 7,477,041 B2 | | 1/2009 | Le Gall et al. | |
| 2004/0161640 A1 | | 8/2004 | Salot | |
| 2004/0251880 A1 | | 12/2004 | O'Brien | |
| 2007/0222411 A1 | | 9/2007 | Cour | |
| 2008/0048623 A1 | | 2/2008 | Le Gall et al. | |

FOREIGN PATENT DOCUMENTS

| | | |
|---|---|---|
| FR | 2 868 218 A1 | 9/2005 |
| FR | 2 870 391 A1 | 11/2005 |
| WO | WO 98/20594 | 5/1998 |
| WO | WO 03/036670 A2 | 5/2003 |
| WO | WO 2005/122319 A1 | 12/2005 |
| WO | WO 2008/065273 A2 | 6/2008 |

* cited by examiner

*Primary Examiner* — Edward Tso
(74) *Attorney, Agent, or Firm* — Oliff & Berridge, PLC

(57) ABSTRACT

The autonomous system comprises an intermittent power source delivering a direct current. A supercapacitance is connected in parallel with the battery and the power source respectively via a first switch and a second switch. Charging of the battery comprises pulsed current charging managed by a control circuit. During a current pulse, the amplitude of the current and the amplitude of the voltage increase at the terminals of the battery are measured. The dynamic internal resistance of the battery is determined from said amplitudes. A maximum acceptable current threshold is determined according to a maximum voltage threshold, to said dynamic internal resistance and to the no-load voltage at the battery terminals. At the next current pulse, the value of the charging current is limited by controlling the closing time of the second switch.

4 Claims, 2 Drawing Sheets

METHOD FOR PULSED CHARGING OF A BATTERY IN AN AUTONOMOUS SYSTEM COMPRISING A SUPERCAPACITANCE

BACKGROUND OF THE INVENTION

The invention relates to a method for charging a battery of an autonomous system by means of an intermittent power source delivering a direct current, the method comprising at least one phase of charging at pulsed current managed by a charging control circuit.

STATE OF THE ART

Autonomous systems supplied by intermittent power sources, for example by photovoltaic panels or generators of wind-power type, are called on to develop. These autonomous systems are often installed in isolated places which are difficult to access for which the cost of a conventional power supply by cable would be prohibitive. For this type of configuration, optimizing maintenance and autonomy is of paramount importance to enable a large reduction of operating costs to be achieved.

Performing the final step of charging a battery by means of a pulsed current has proved its worth from the electrochemical standpoint. Indeed, by adapting the current value, the charging time and the charging frequency, the charging process can then be improved thereby enhancing the lifetime of the battery. Pulsed current charging and end-of-charging methods have in particular been described in the document WO-A-2005/122319 and in International Patent application PCT/FR2007/001821 filed on Nov. 5, 2007.

However the power and energy able to be generated by intermittent power sources such as photovoltaic panels or wind-power generators are limited. This is why batteries are conventionally connected directly to the power source and a switch performs disconnection of the battery in case of overcharging.

OBJECT OF THE INVENTION

The object of the invention is to provide a method that is easy to implement, that is compatible energy-wise with pulsed current end-of-charging and that ensures a long lifetime of the battery.

The method according to the invention is characterized by the appended claims and more particularly by the fact that a super-capacitance being connected in parallel with the battery via a first electronic switch and in parallel with the power source via at least a second electronic switch, the control circuit successively performs:

- measuring, during a current pulse, the amplitude of the current pulse and the amplitude of the voltage increase at the terminals of the battery during said pulse,
- determining the dynamic internal resistance of the battery from said amplitudes,
- determining a maximum current threshold acceptable by the battery according to a predefined maximum voltage threshold and to said dynamic internal resistance,
- limiting the value of the battery charging current, at the next current pulse, to a value lower than said maximum current threshold by controlling the closing time of the second electronic switch.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF A PREFERRED EMBODIMENT OF THE INVENTION

Figure 1:
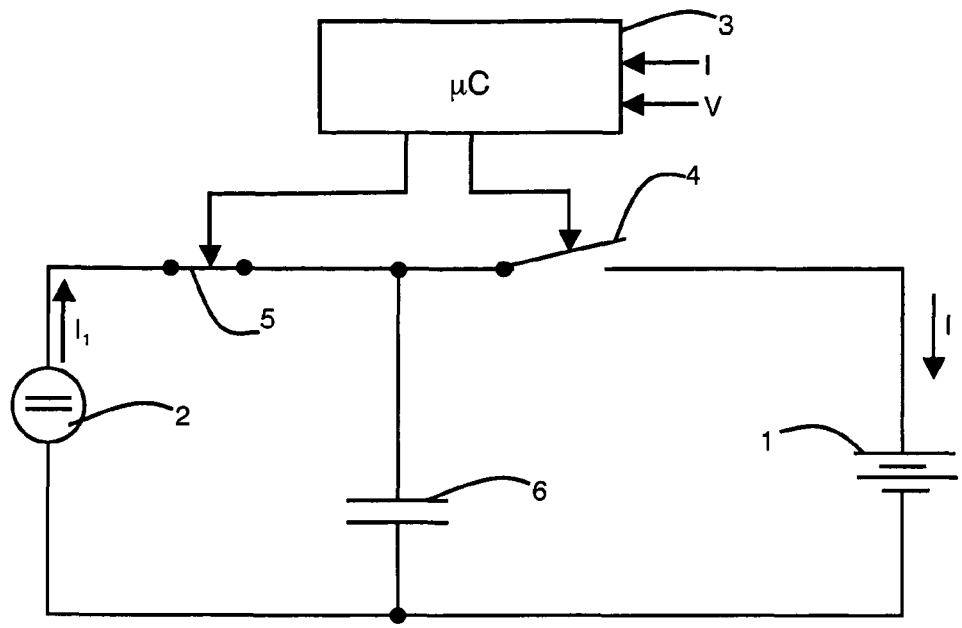
FIG. 1 schematically represents an autonomous system according to the invention.

As illustrated in FIG. 1, the autonomous system comprises at least one battery 1 constituting a power storage element, an intermittent power source 2 and a charging control circuit 3 comprising means for managing charging and end of charging. First 4 and second 5 electronic switches are connected in series between intermittent power source 2 and battery 1. Opening and closing of electronic switches 4, 5 are controlled by charging control circuit 3 via integrated control means.

Battery 1 is for example a lead or nickel battery and in more general manner a battery with an aqueous electrolyte.

During its operating periods, intermittent power source 2 delivers a direct current $I_1$ which depends on the outside environment.

The system also comprises an intermediate power storage element formed by a supercapacitance 6. Supercapacitance 6 is connected in parallel with power storage element 1 via a first electronic switch 4 and in parallel with the intermittent power source via at least a second electronic switch 5. As illustrated in FIG. 1, supercapacitance 6 is thus connected between the first and second electronic switches. Intermediate power storage element 6 has to present storage characteristics, in particular in terms of efficiency and lifetime, that are compatible with use in an autonomous set-up.

For satisfactory management of the pulsed charge, the voltage at the terminals of the supercapacitance 6 must not be substantially greater than that of battery 1 to avoid damaging the battery at each current pulse. Advantageously, when the current pulse is applied, the voltage is chosen close to that at the terminals of battery 1. In this way, in the event of a command malfunction of an element of control circuit 3 or of an electronic switch 4 and 5, large currents are avoided. For example, an electronic switch 4 of the type that is closed under zero voltage can be chosen, which enables the two voltages to be kept equal in the event of a malfunction.

An energy storage hybrid device comprising a supercapacitance and a micro-battery in combination is known, in particular from the document WO-A-2003/03667, to enable high-speed charging. Associating these two components enables a large quantity of energy to be stored while at the same time having a high instantaneous power available. In this document, the supercapacitance is charged very rapidly (in less than one second) from an external power source, and the microbattery is then recharged for the necessary time, for example a few minutes, from the supercapacitance.

Figure 2:
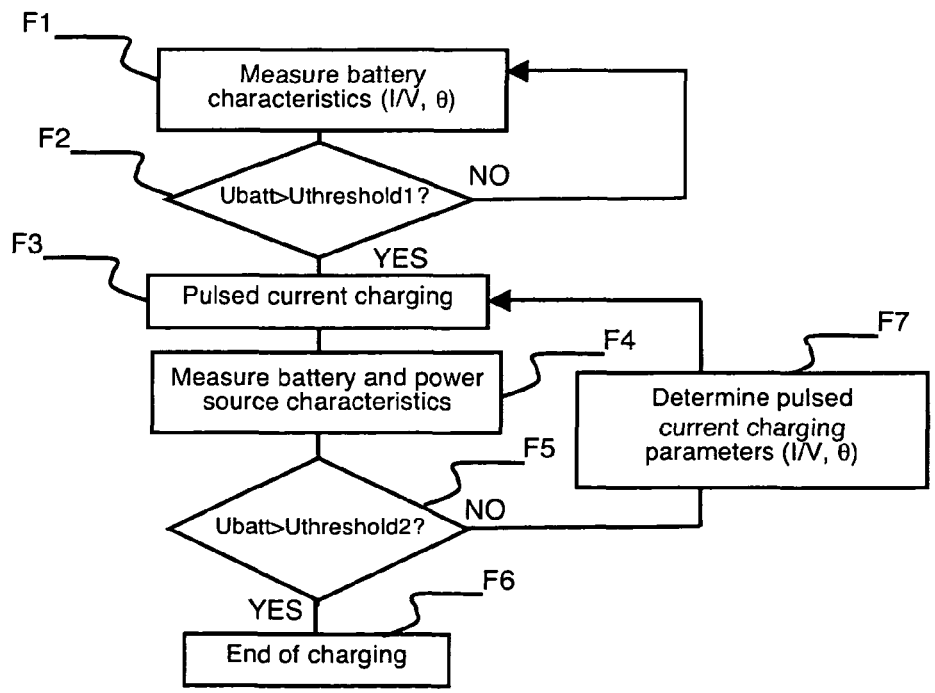
FIG. 2 represents a particular embodiment of a method according to the invention in flowchart form.

In the particular embodiment illustrated by the flowchart of FIG. 2, control circuit 3 determines (step F1) the different characteristics of battery 1 from measurements (I/V) of the voltage and current at the terminals of battery 1 provided by suitable measuring circuits. Advantageously, control circuit 3 takes the temperature of the battery or a characteristic temperature into account. Control circuit 3 compares (step F2) the characteristics of the battery with a first predefined threshold, the end-of-charging threshold of the first type of charging, for example the voltage at the battery terminals, in order to determine whether the end-of-charging threshold of the first type of charging has been reached.

If the voltage at the battery terminals $U_{batt}$ is lower than the first predefined threshold $U_{threshold1}$ (NO output of F2), the end-of-charging criterion has not been met and control circuit 3 continues charging the battery according to a first charging mode. End-of-charging criterion $U_{threshold1}$ corresponds for example to 90% or even 95% of the maximum voltage of the battery (which corresponds to 80% of the state of charge).

If the voltage at the battery terminals $U_{batt}$ is higher than the first predefined threshold $U_{threshold1}$ (YES output of F2), the end-of-charging criterion has been reached and the control circuit 3 triggers (step F3) switching to the second charging mode which is pulsed current charging. Pulsed current charging is managed by control circuit 3 which then determines (step F4) the different characteristics of battery 1 and of intermittent power source 2 from measurements (I/V) of the voltage and current at the terminals of battery 1 and of intermittent power source 2.

Control circuit 3 compares (F5) the characteristics of battery 1 with a second predefined threshold, the end of pulsed current charging threshold, for example the voltage at the battery terminals $U_{batt}$ in order to determine whether the end of pulsed current charging threshold, for example a threshold voltage $U_{threshold1}$, has been reached.

If the voltage at the battery terminals $U_{batt}$ is greater than the second predefined threshold $U_{threshold1}$ (YES output of F5), control circuit 3 stops charging (F6) the battery, for example by disconnecting battery 1.

If the voltage at the battery terminals $U_{batt}$ is lower than the second predefined threshold $U_{threshold2}$ (NO output of F5), control circuit 3 continues charging battery 1 according to the second charging mode, and control circuit 3 then determines (F7) the optimal charging parameters for pulsed current charging. These parameters are for example the frequency of the current pulses, typically 1 Hz, and the duty factor of the pulse, i.e. the time spent in high state compared with the time spent in low state within a period, typically 25%. The current value, when the pulse is applied, is consequently directly deduced from the values of the previous two parameters. Battery 1 is then charged with a pulsed current charge according to the parameters defined above.

Figure 3:
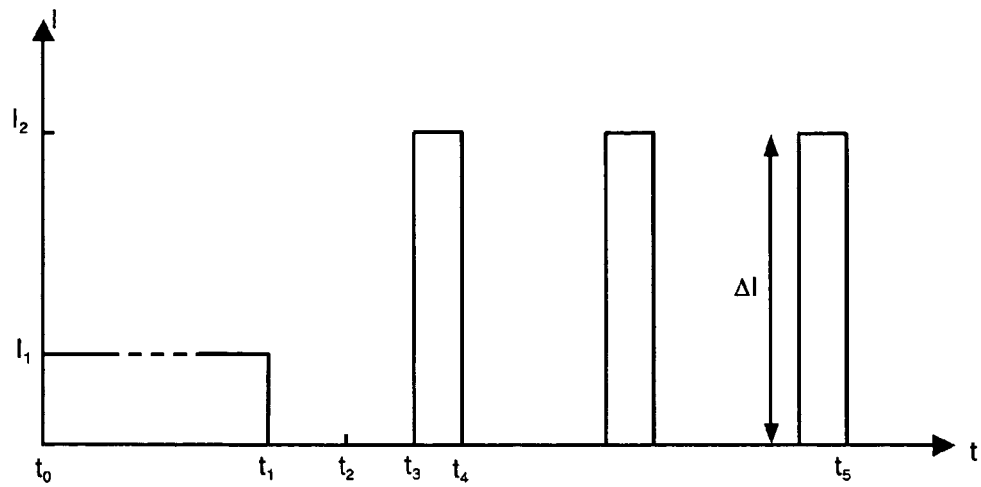
FIG. 3 illustrates the variations of the battery charging current I versus time in a method according to the invention.
Figure 5:
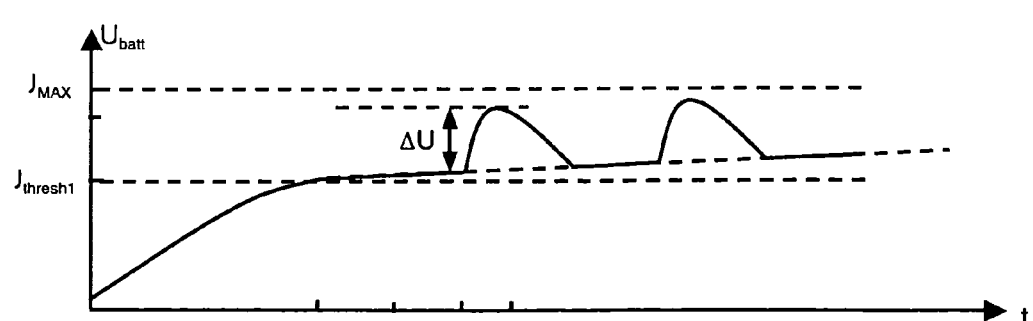
FIG. 5 illustrates the variations of the voltage $U_{batt}$ at the battery terminals versus time in a method according to the invention.

As illustrated in FIGS. 3 and 5, charging of battery 1 from the power generated by power source 2 comprises two successive phases. In a first charging phase (between the times $t_0$ and $t_1$), battery 1 is charged until a first charging threshold is reached. This first charging phase is performed by means of a first type of charging, advantageously direct current charging, typically with a current $I_1$. Other types of charging can however be used, for example charging at constant voltage.

In a second charging phase, charging control circuit 3 performs charging by a pulsed current charging phase (between the times $t_1$ and $t_5$). In this charging phase, the direct current delivered by power source 2 is converted into pulsed current having predefined characteristics. During the pulsed current charging phase, first and second switches 4 and 5 are actuated independently. The operations of first and second switches 4 and 5 are always independent from one another both in the first and second charging phase.

When pulsed current charging is performed, first switch 4 enables the time characteristics of the current pulses to be defined, in particular the frequency and duty factor. Second switch 5 enables charging of the supercapacitance to be limited by limiting the charging time.

In a first period of pulsed current charging (between times $t_1$ and $t_2$ in FIG. 2), second electronic switch 5 is closed and first electronic switch 4 is open. Battery charging current I is zero (FIG. 3). Power source 2 is then directly connected to supercapacitance 6 which is disconnected from battery 1. Supercapacitance 6 charges. Power source 2 being assimilated to a direct current source, the voltage at the terminals of supercapacitance 6 is proportional to its charging time, i.e. to the time period separating times $t_1$ and $t_2$. At time $t_2$, the voltage at the terminals of the supercapacitance is equal to $V_0$ (FIG. 4).

In a second time period (between times $t_2$ and $t_3$ in FIGS. 3 to 5), second switch 5 is open. First 4 and second 5 switches are then in the same state. In this second time period, supercapacitance 6 that was previously charged at voltage $V_0$ is no longer supplied with current by power source 2. As the time period between times $t_2$ and $t_3$ is short, the voltage at the terminals of the capacitance is considered to be constant. Furthermore, as the voltage at the battery terminals is constant, it has not changed since the first charging mode was stopped, i.e. since the time $t_1$ (FIG. 5).

Figure 4:
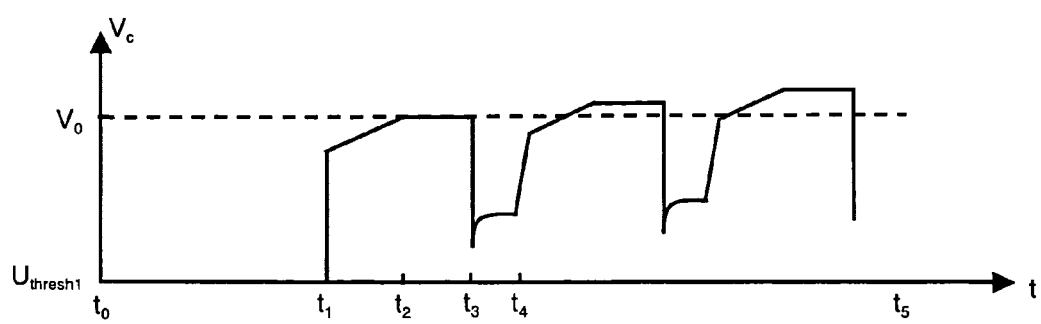
FIG. 4 illustrates the variations of the voltage $V_c$ at the terminals of the supercapacitance versus time in a method according to the invention.

In a third time period, between times $t_3$ and $t_4$ in FIGS. 3 to 5, first switch 4 is closed, supercapacitance 6 no longer being connected with power source 2, supercapacitance 6 then charges battery 1 with a current $I_2$, which corresponds to a current pulse. The current supplied by supercapacitance 6 decreases as the latter discharges. The power stored in the super-capacitance is sent to battery 1 during the time period $t_4$-$t_3$. The battery having an internal resistance $R_{ib}$, an overvoltage $\Delta U$ occurs at the battery terminals on each current pulse, i.e. between times $t_3$ and $t_4$ in FIG. 5. On the two pulses represented in FIG. 5, it can be seen that the voltage at the battery terminals, outside the pulses, increases slightly, which indicates a significant increase of the state of charge.

During a current pulse, the state of battery 1 does not change much and its electromotive force E is therefore constant. The modification of charging voltage $V_c(t)$ and current $I(t)$ of the battery with time can therefore be described by the following equations:

$$V_c(t) = E + (V_0 - E) \cdot e^{-t/R_i C}$$

$$I(t) = \frac{(V_0 - E) \cdot e^{-t/R_i C}}{R_i}$$

in which:
E is the electromotive force of battery 1,
$V_0$ is the voltage at the terminals of supercapacitance 6 at the beginning of the current pulse,
$R_i$ the sum of the internal resistance of supercapacitance 6 and of battery 1,
C is the electrical capacitance of supercapacitance 6.

Periodical repetition of these pulses constitutes the pulsed current used for the pulsed current charging phase designed to terminate charging of the battery. The frequency and duty factor of the pulsed current are defined by the switching frequency of switches 4 and 5.

The battery charging voltage and current are functions of the voltage at the terminals of supercapacitance $V_c$ which is itself a function of its charging time from power source 2. The period between times $t_3$ and $t_4$ corresponds to the duration of the current pulse. The period between times $t_1$ and $t_3$ corresponds to the rest of the period during which no current is supplied to battery 1. The period of the current pulses corresponds to the period between times $t_1$ and $t_4$. In advantageous manner, adjustment of the frequency and duty factor of pulsed current charging is achieved by means of the period between times $t_2$ and $t_3$.

If the duration of the period between times $t_1$ and $t_2$ is greater than the period determined by control circuit 3 to perform pulsed current charging, then second switch 5 is always in the closed state.

By means of supercapacitance 6 and independent opening and closing of first 4 and second 5 switches, control circuit 3 can perform charging of the battery in the form of a current pulse of amplitude $I_2$, greater than the amplitude $I_1$ of the current able to be supplied by power source 2, with a very large freedom of pulse frequency and duty factor.

When pulsed current charging is performed, during each period, power transfer takes place from power source 2 to supercapacitance 6 and then from supercapacitance 6 to battery 1, but this can also be simultaneous.

Inclusion of supercapacitance 6 acting as intermediate storage element between power source 2 and battery 1 enables current pulses of higher amplitude to be obtained during the pulsed current charging phase while at the same time restoring the power supplied by power source 2 rapidly to battery 1.

To prevent any premature damage to battery 1, the voltage $U_{batt}$ at the terminals of the latter must not exceed a predefined voltage threshold $U_{MAX}$. Battery 1 having an internal resistance, at each current pulse, the voltage at the battery terminals increases, which may be detrimental. To prevent the voltage at the battery terminals from exceeding the maximum voltage threshold $U_{MAX}$ during a current pulse, control circuit 3 therefore limits charging current $I_2$ to a maximum acceptable current threshold $I_{MAX}$. As the state of battery 1 varies with the current pulses, the maximum acceptable current $I_{MAX}$ can vary at each pulse. To prevent any increase of the voltage detrimental to the battery, the power stored in supercapacitance 6, which is then delivered to battery 1 in the form of a current pulse, is limited.

For each current pulse, control circuit 3 thus measures the voltage amplitude $\Delta U$ at the terminals of battery 1, i.e. the voltage difference $\Delta U$ between the maximum and minimum voltages reached on a current pulse. The minimum voltage typically corresponds to the no-load voltage $U_{threshold1}$ at the battery terminals. Control circuit 3 also measures the amplitude of the current pulse $\Delta I$ at the battery terminals for each pulse. The minimum current can be zero, which is typically the case when first switch 4 is open, and the battery is not charged. The current can also be close to that delivered continuously by power source 2, typically by leaving the first switch continuously closed and only controlling opening and closing of second switch 5.

Control circuit 3 then determines the value of the dynamic internal resistance DIR of the battery from the measured values of voltage amplitude $\Delta U$ and current amplitude $\Delta I$ at the battery terminals by the formula $DIR=\Delta U/\Delta I$. The dynamic internal resistance DIR of the battery is a characteristic that varies as charging is performed.

Control circuit 3 then determines the maximum current threshold $I_{MAX}$ acceptable by battery 1 by means of the maximum threshold voltage $U_{MAX}$ acceptable by the battery and the dynamic internal resistance DIR with the formula: $I_{MAX}=(U_{MAX}-U_{threshold1})/DIR$ where $U_{threshold1}$ corresponds to the no-load voltage at the terminals of battery 1. When pulsed current charging is performed, battery charging current I2 cannot be greater than the maximum acceptable current threshold $I_{MAX}$.

Thus, for the next current pulse, if the value of charging current $I_2$ defined by the optimal charging conditions is greater than the acceptable current threshold $I_{MAX}$, control circuit 3 then limits the value of the battery charging current to a value lower than maximum current threshold $I_{MAX}$. The value of the current on a current pulse being linked to the energy stored in the super-capacitance and therefore to the voltage at its terminals, the control circuit limits the supercapacitance charging time by controlling the closing time of second electronic switch 5: This supercapacitance charging time is represented in FIGS. 3 to 5 by the period between times $t_1$ and $t_2$.

For example, the autonomous system is formed by a 12V lead battery 1 of 65 Ah type. In a first phase, battery 1 is charged with a constant current equal to 2 A. Then, when the voltage at the terminals of battery 1 reaches 13.85V (corresponding substantially to an 80% charged battery), battery 1 is charged with a pulsed current. This pulsed current is a square signal that varies between 0 and 8 A with a frequency of about 1 Hz and a duty factor of about ¼ (i.e. 25% of the time with a charging current of 8 A and 75% of the time with zero current). Supercapacitance 6 is preferably formed by an assembly of seven 2.5V supercapacitances for 350 F and forms a supercapacitance having a rated voltage of 17.5V and a capacitance of about 50 F. The supercapacitance is charged by a current equal to 2 A.

In the pulsed current charging phase, control circuit 3 can modify the characteristics of the pulsed current (charging intensity, charging time, charging frequency, etc) according to the state of charge of battery 1 by means of the closing and opening control means of electronic switches 4 and 5.

The search and charge algorithms can be integrated in the charging and end-of-charging control means and/or in a control unit. Measuring circuits respectively enabling the voltage V at the terminals of battery 1 and the charging current I of the battery to be measured are connected to inputs of charging control circuit 3.

In conventional manner, a temperature measurement circuit is also connected to control circuit 3 and a load (not represented) is conventionally supplied by battery 1.

Power source 2 is for example of micro-hydraulic, wind-power type or advantageously a photovoltaic panel, and the power storage cell 1 is for example a lead or nickel battery.

The invention claimed is:
1. A method for charging a battery of an autonomous system by means of an intermittent power source delivering a direct current, the method comprising at least one phase of charging at pulsed current managed by a charging control circuit, the control circuit successively performs:
   measuring, during a current pulse, an amplitude of a current pulse and an amplitude of a voltage increase at terminals of the battery during said pulse,
   determining a dynamic internal resistance of the battery from said amplitudes,
   determining a maximum current threshold acceptable by the battery according to a predefined maximum voltage threshold, to said dynamic internal resistance and to a no-load voltage at the battery terminals,
   limiting a value of the battery charging current, at next current pulse, to a value lower than said maximum current threshold by controlling a closing time of a second electronic switch.

a method wherein a supercapacitance being connected in parallel with the battery via a first electronic switch and in parallel with the power source via at least the second electronic switch.

2. The method according to claim 1, wherein the intermittent power source is a photovoltaic panel.

3. The method according to claim 1, wherein the battery is a battery with an aqueous electrolyte.

4. The method according to claim 1, comprising a charging phase at constant current before the charging phase at pulsed current.

* * * * *